United States Patent [19]

Sawazaki

[11] Patent Number: 4,535,369

[45] Date of Patent: Aug. 13, 1985

[54] MAGNETIC RECORDING AND REPRODUCING APPARATUS

[75] Inventor: Norikazu Sawazaki, Yokohama, Japan

[73] Assignee: Tokyo Shibaura Denki Kabushiki Kaisha, Kawasaki, Japan

[21] Appl. No.: 552,390

[22] Filed: Nov. 16, 1983

Related U.S. Application Data

[63] Continuation-in-part of Ser. No. 513,386, Jul. 13, 1983.

[30] Foreign Application Priority Data

| Jul. 16, 1982 [JP] | Japan | 57-122942 |
| Jul. 16, 1982 [JP] | Japan | 57-122943 |
| Nov. 9, 1982 [JP] | Japan | 57-196377 |
| Nov. 18, 1982 [JP] | Japan | 57-202283 |

[51] Int. Cl.³ .................................................. G11B 5/02
[52] U.S. Cl. .................................. 360/55; 360/134
[58] Field of Search ............... 360/55, 110, 131, 134, 360/128

[56] References Cited

U.S. PATENT DOCUMENTS

| 3,701,133 | 10/1972 | Smaller | 360/114 |
| 4,351,010 | 9/1982 | Arai | 360/134 |
| 4,447,159 | 4/1984 | Dezawa et al. | 360/134 |

Primary Examiner—Vincent P. Canney
Attorney, Agent, or Firm—Oblon, Fisher, Spivak, McClelland & Maier

[57] ABSTRACT

Signals are recorded on a magnetic tape having a magnetic recording layer containing a magnetic material whose high frequency characteristic varies with a magnetic field produced therein. Changes in the coupling degree of a high frequency coupling circuit caused by a signal field allows to reproduce a recorded signal.

9 Claims, 17 Drawing Figures

FIG. 12
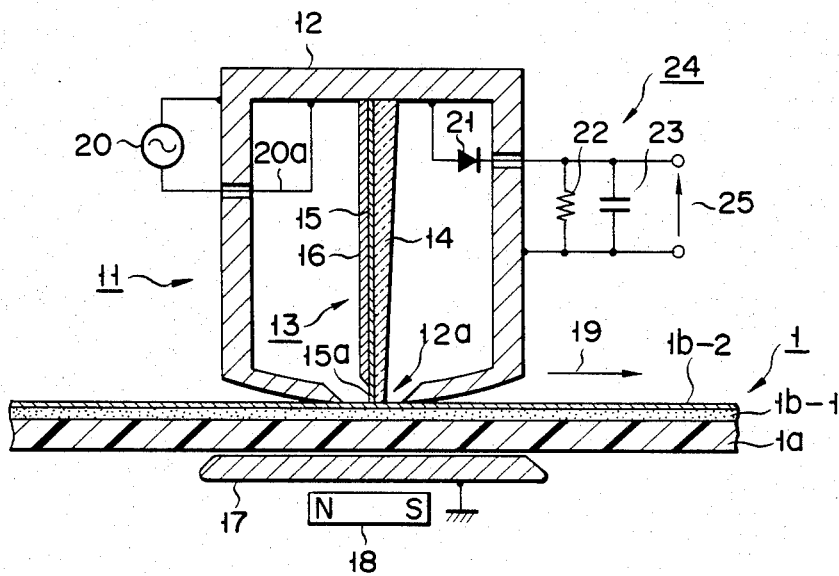
FIG. 13
FIG. 14
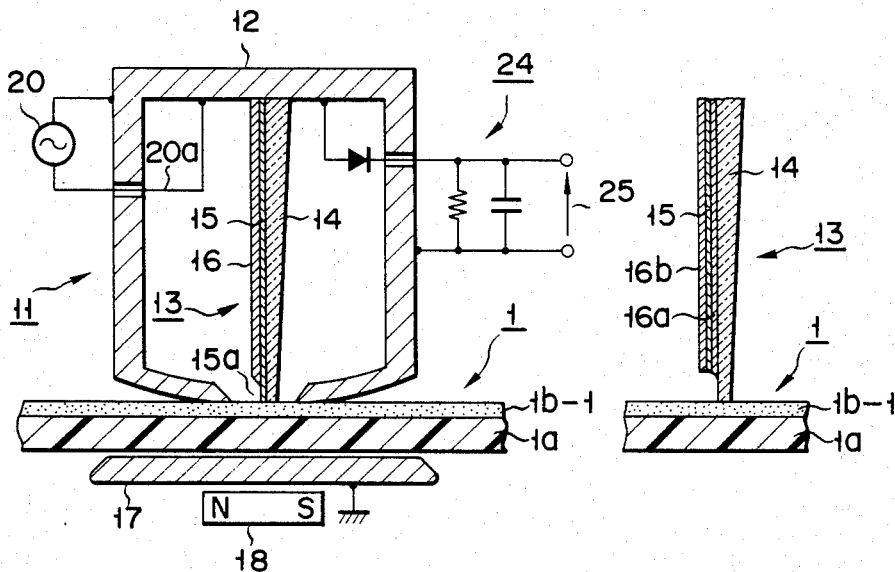

F I G. 15
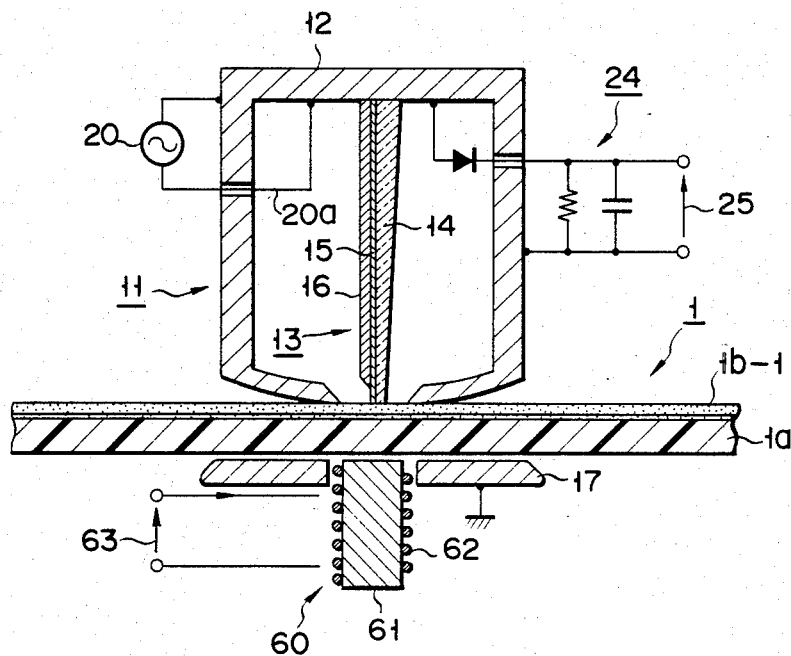
F I G. 16
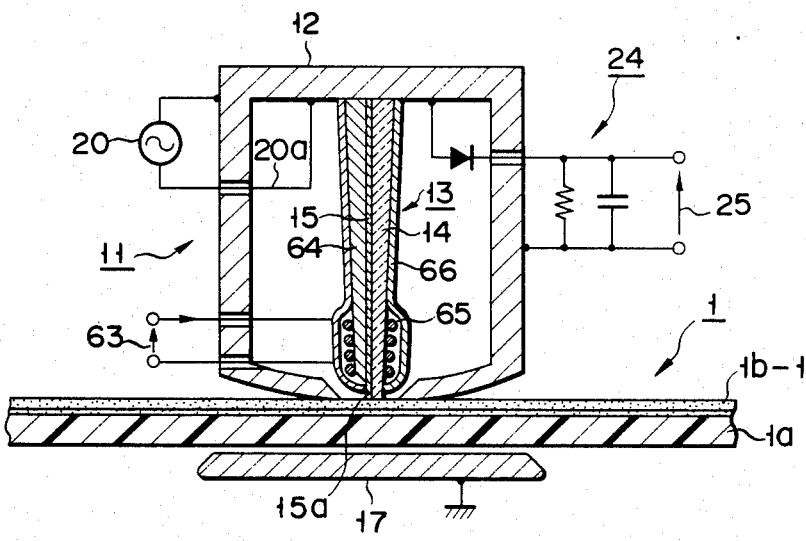

MAGNETIC RECORDING AND REPRODUCING APPARATUS

CROSS-REFERENCE TO THE RELATED APPLICATION

This application is a continuation-in-part of application Ser. No. 513,386, filed on July, 13, 1983.

BACKGROUND OF THE INVENTION

This invention generally relates to a magnetic recording and reproducing apparatus and, more particularly, to a magnetic recording and reproducing apparatus which permits high density recording and reproduction of signals.

Heretofore, the magnetic recording and reproducing apparatus has been used most extensively for an electric signal recording and reproducing system, for instance for magnetic disc, magnetic drum and magnetic tape recorders used for audio tape recorders, video tape recorders and computer data processing systems.

Such a magnetic recording and reproducing system uses a reproducing head with a ring core. The tip of the head is held in contact with a running magnetic recording medium and an electromotive force induced in a coil wound on the ring core according to a change in a recorded magnetic field is taken out as a reproduced output. In order to be able to obtain a sufficiently large reproduced output with a satisfactory signal-to-noise ratio, it is necessary to produce a sufficiently high intensity magnetic field in the magnetic recording medium. Therefore, a wide recording track is necessary, which is undesirable from the standpoint of the high density recording of signals.

SUMMARY OF THE INVENTION

An object of the invention is to provide a magnetic recording and reproducing apparatus which permits high density and reliable recording and reproduction of signals.

According to the invention, there is provided a magnetic recording and reproducing apparatus comprising:

a magnetic material whose high frequency characteristic varies with a signal magnetic field from a magnetic recording medium;

a high frequency coupling circuit whose coupling degree varies with said high frequency characteristic of the magnetic material; and means for reproducing a signal recorded on said magnetic recording medium in accordance with the variation of the coupling degree of said high frequency coupling circuit.

BRIEF DESCRIPTION OF THE DRAWINGS

FIGS. 4 through 17 are schematic view showing further embodiments.

DETAILED DESCRIPTION OF THE PREFERRED EMBODIMENTS

The invention will now be described in conjunction with some preferred embodiments thereof with reference to the drawings.

Figure 1:
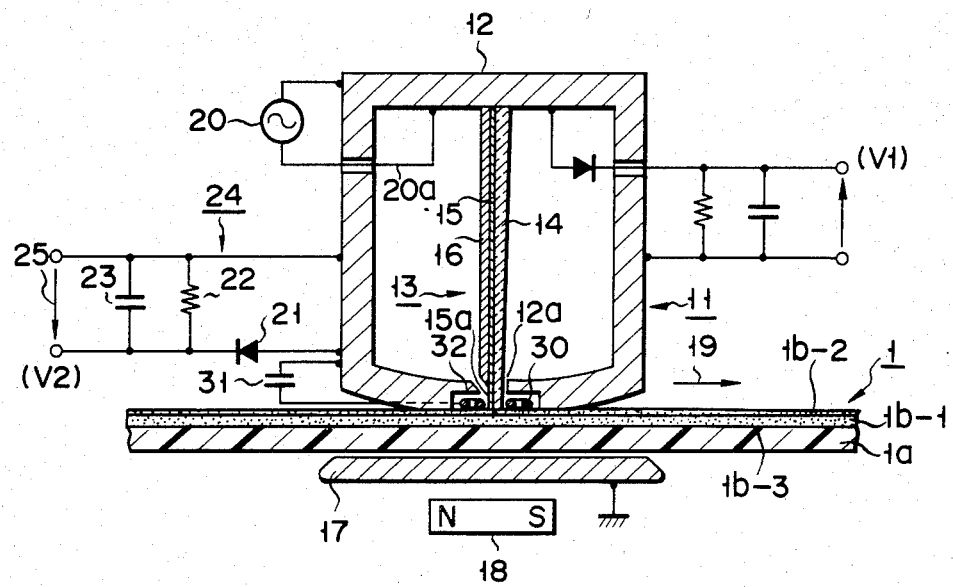
FIG. 1 is a schematic view showing one embodiment of the invention.

Referring to FIG. 1, there is shown one embodiment of the invention, which uses a magnetic tape 1 which has a synthetic resin film base 1a, a magnetic recording film 1b-1 formed on one side of the base 1a and a magnetic layer 1b-2 formed on the film 1b-1. In this instance, the magnetic recording film 1b-1 is suited for vertical magnetization recording, and the magnetic layer 1b-2 consists of a magnetic material which is magnetizable by vertical magnetization, and magnetic permeability $\mu$ of the magnetic layer 1b-2 is variable according to a high frequency magnetic field applied to it. Examples of the magnetic material are yttrium iron garnet (YIG) for the layer 1b-2 and powdery magnetic materials such as $\gamma$-$Fe_2O_3$ and barium ferrite for the recording film 1b-1. It is also possible to replace YIG with sendust.

A reproducing head 11 is constituted by a cylindrical outer conductor 12 and a stylus electrode 13 as an inner conductor. The stylus electrode 13 has a stylus base 14 of glass and a permalloy film 15 which is 0.1 to 0.3 $\mu$ thick formed on one side of the stylus base 14. A conductive film 16, for instance a copper film, is formed on a portion of the permalloy film 15 other than a tip portion 15a thereof to reduce the frequency loss in the former portion. The tip of the stylus electrode 13 projects from an open end 12a of the outer conductor 12 and is in contact with the surface of the magnetic layer 1b-2 of the tape 1.

A conductor 17 serving as a grounding plate is provided on the side of the tape 1 opposite to the outer conductor 12 and stylus electrode 13. A permanent magnet 18 (or an electromagnet) may be provided, if necessary, on the side of the conductor 17 opposite the tape 1. The outer conductor 12, stylus electrode 13 and conductor 17 constitute a high frequency resonant circuit in the reproducing head 11 with a resonant current path thereof extending in the direction of thickness of the tape 1.

For reproducing signals recorded on the tape 1, the reproducing head 11 is moved relative to the tape 1 in the direction of arrow 19. High frequency energy in a microwave band, for instance from about 500 MHz to about 1,000 MHz, is supplied from a high frequency oscillator 20 to the high frequency resonant circuit, i.e., coaxial resonator, through a coupling coil 20a. The high frequency characteristics of the magnetic layer 1b-2 and the permalloy film 15 such as high frequency loss or magnetic permeability thereof are varied according to the signal field from the tape 1. In FIG. 1, a second coupling coil 30 is wound on a tip portion of the stylus electrode 13. The second coupling coil 30 has one end connected to the outer conductor 12 and the other end connected thereto through a resonant capacitor 31. It is substantially free from electric coupling to the coaxial resonator due to the presence of an electric shield 32 provided at the end of the outer conductor 12 adjacent to the tape 1.

The coaxial resonator and second coupling coil 30 constitute, along with input coupling coil 20a, a high frequency coupling circuit, in which the magnetic layer 1b-2 and the permalloy film 15 are coupling elements.

For reproducing the signal recorded on the magentic tape 1, the reproducing head 11 is moved relative to the tape 1 in the direction of arrow 19 while supplying high frequency energy from the high frequency oscillator 20 to the high frequency coupling circuit through the input coupling coil 20a. The high frequency characteristics of the magnetic layer 1b-2 and the permalloy film 15, such as high frequency loss or magnetic permeability, vary according to the signal field from the magnetic recording film 1b-1. In particular, the relation between the signal field and frequency of the high frequency energy is suitably selected so as to cause magnetic resonance of the magnetic layer 1b-2, permalloy film 15 and the signal field. The tensor magnetic permeability is greatly varied by the magnetic resonance. With this magnetic resonance the magnetic film 1b-2 and the permalloy film 15 are coupled to the stylus electrode 13 and second coupling coil 30. In other words, the degree of electromagnetic coupling of the high frequency coupling circuit is increased from zero according to the signal field.

With the changes in the electromagnetic coupling degree the high frequency output appearing at the output of the coaxial resonator is modulated according to the signal field. The changes in the high frequency output are detected by the peak detecting circuit 24 composed of a diode 21, a resistor 22 and a capacitor 23, whereby the reproduced output 25 can be obtained.

A tungsten film (not shown) may be substituted for the permalloy film 15. In this case, good magnetic resonance can also be realized by the magnetic layer 1b-2 and the signal field.

Figure 2:
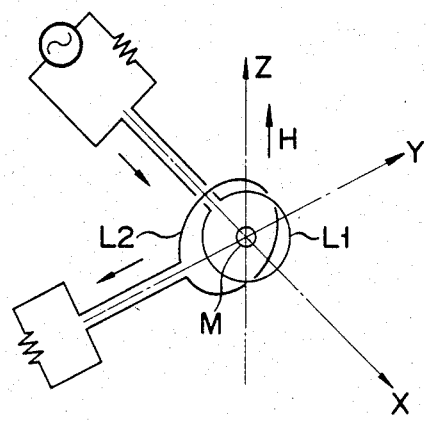
FIG. 2 is a view illustrating the principles underlying the embodiment of FIG. 1.

The principles of reproduction utilizing the magnetic resonance noted above will now discussed with reference to FIG. 2. The set-up of FIG. 2 has two loop coils L1 and L2 which are disposed such that their loop planes are normal to two perpendicular axes X and Y. A magnetic member M consisting of a magnetic resonance material (e.g, YIG) is disposed at the intersection of the axes X and Y. An external field H is applied to the magnetic member M in a direction Z parallel to both the loop coils L1 and L2, i.e., normal to the axes X and Y, while a microwave at the frequency of the magnetic resonance determined by the applied filed is applied to the loop coil L1. Consequently, the magnetic moment of the magnetic member M causes a precession about the axes X and Y. The tensor permeability of the magnetic member M is thus increased so that the loop coil L1 is coupled to the other coil L2, whereby the microwave is transmitted from the former coil to the latter. It will be seen that the degree of coupling between both the loop coils L1 and L2 is varied according to the intensity of the field H.

Figure 3:
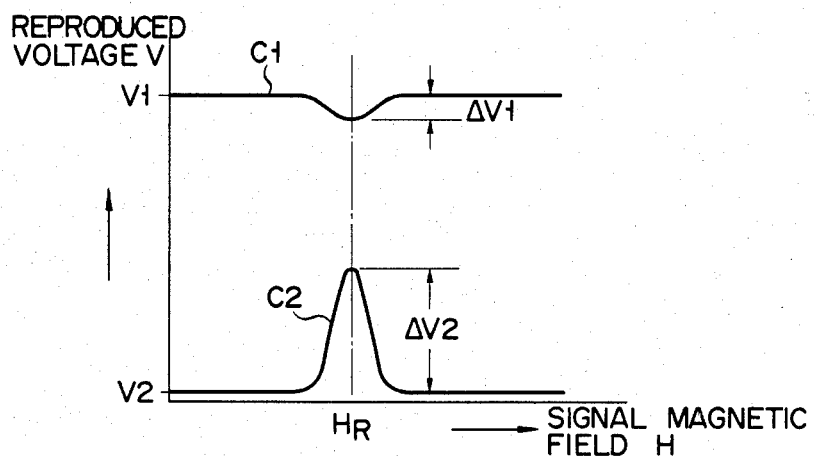
FIG. 3 is a graph illustrating the reproducing characteristic of the embodiment of FIG. 1.

Obviously, the reproduction of signal can be obtained by detecting the changes in the high frequency output voltage which correspond to the changes in the coupling degree of the high frequency coupling circuit. FIG. 3 shows the relation between the reproduced output voltage V and signal field H. A characteristic of curve C1 results without the second coupling coil 30, i.e., in case where changes in the coupling degree according to the signal field H are not utilized. Curve C2 represents the reproduction characteristics that are obtainable by utilizing the coupling degree changes with the signal field H. With the characteristic C1, the reproduced output level change corresponding to $H=H_R$ ($H_R$ being a field level that can cause magnetic resonance) with respect to output level V1 corresponding to $H=0$ is $\Delta V1/V1$, whereas with the characteristic C2 the reproduced output level change corresponding to $H=H_R$ with respect to output level V2 corresponding to $H=0$ is $\Delta V2/V2$. The latter is far greater than the former. Where the coupling degree is not utilized, the resonators Q must be increased to increase the reproduction sensitivity. This gives rise to noise due to variations of the resonant point of the resonator and mechanical vibrations of the recording medium, magnetic head and reproducing head. Also, the signal-to-noise ratio of the reproduced output is reduced with the reduction of the C/N of the high frequency output.

According to this embodiment, a large output can be obtained owing to the utilization of great changes of the coupling degree of the high frequency resonant circuit. In addition, the coaxial resonator constitutets a high frequency coupling circuit through a magnetic material capable of magnetic resonance, so that it is possible to reduce noise due to variations of the resonant point and mechanical vibrations and also to reduce the influence of the C/N of the high frequency output on the signal-to-noise ratio of the reproduced output.

Figure 4:
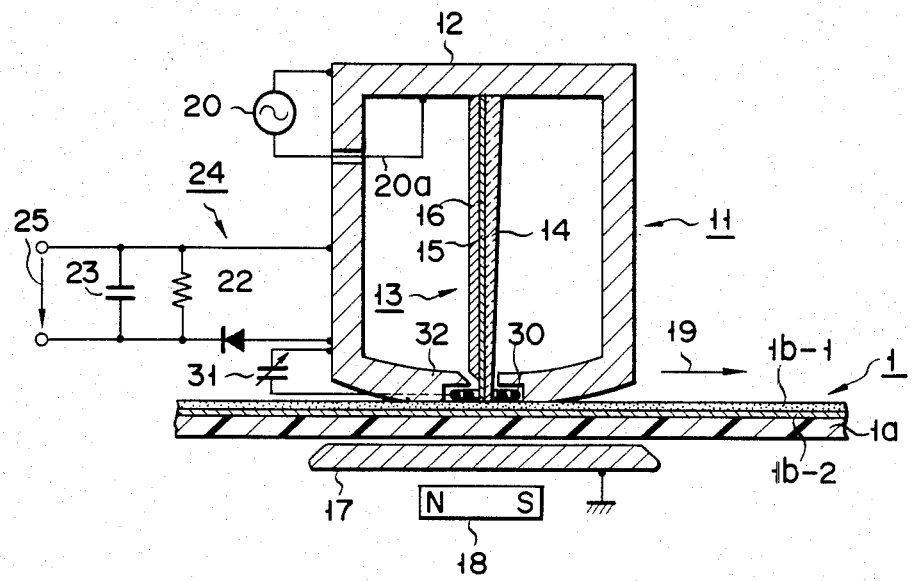

FIG. 4 shows a further embodiment. In this case, a magnetic tape 1, having a region base 1a, a magnetic recording film 1b-1 and a magnetic layer 1b-2 sandwiched between the base 1a and the film 1b-1 is used. Also, a permalloy film 15 is formed on one side of the stylus substrate 14 of stylus electrode 13 as in the embodiment of FIG. 1. Conductive film 16 is again formed on the surface of the permalloy film 15 other than at a tip portion thereof to reduce the high frequency loss. The signal field from the magnetic tape 1 causes changes in the high frequency characteristics of the permalloy film 15 and mainly the top portion of the film 15. With these changes the coupling degree of the high frequency coupling circuit is varied to vary the high frequency output voltage of the coaxial resonator. The changes in the high frequency output voltage are detected in the manner as described, whereby a reproduced output can be obtained from detecting circuit 24.

Figure 5:
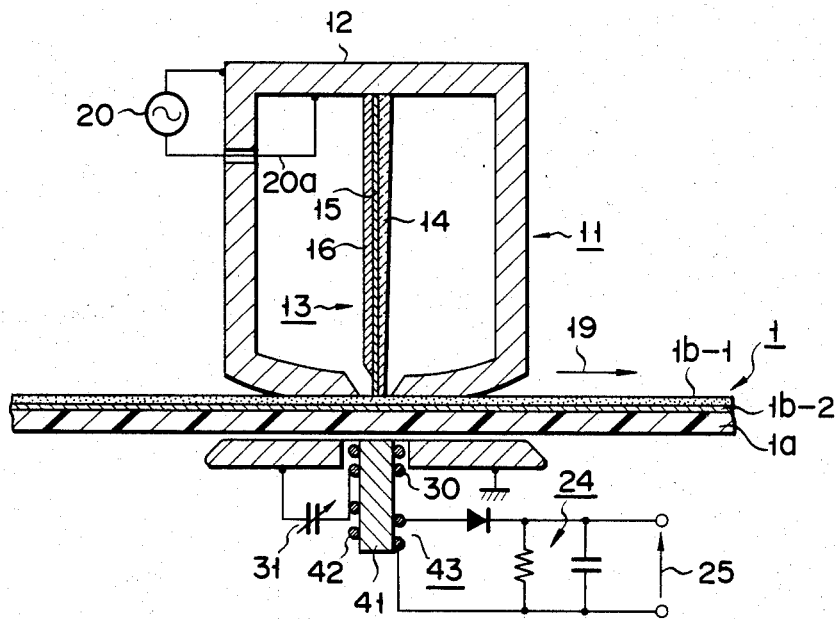
Figure 6:
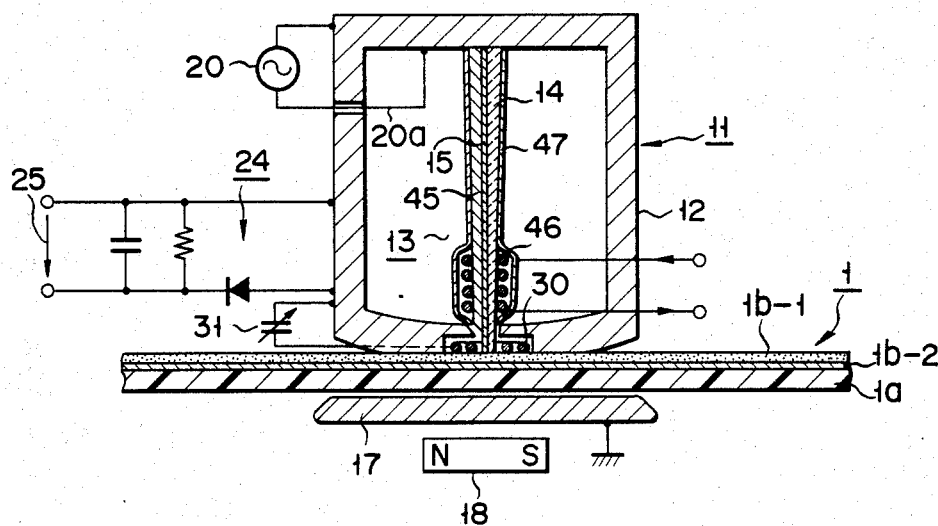

FIGS. 5 and 6 show further embodiments, in which the stylus electrode 13 can serve as the main magnetic pole of the vertical magnetization recording head as well. In the example of FIG. 5, an auxiliary pole excitation type vertical magnetization recording head is used, which includes an auxiliary magnetic pole 43 disposed on the side of magnetic tape 1 on the side opposite to and in opposition to stylus electrode 13 of the structure as shown in FIG. 4 and including a magnetic block 41 and a coil 42 wound thereon, the main magnetic pole of which is constsituted by a permalloy film 15 of the stylus electrode 13. In these embodiments the magnetic tape 1 of FIG. 4 is also used.

In recording, a recording signal current is supplied to the coil 42 to magnetize the magnetic recording layer 1b-1 of the tape 1 in the vertical direction (i.e., thickness direction), whereby high density recording can be obtained. The vertical magnetization recording head may be used as an erasing head as well by supplying an AC or DC erasing current instead of the recording signal current. In this embodiment, a second coupling coil 30 is wound on the magnetic block 41.

In the embodiment of FIG. 6, stylus electrode 13 constitutes a main pole excitation vertical magnetization recording head. A ferrite film 45 is formed on permalloy film 15 except for a tip portion thereof necessary for the reproduction. A coil 46 is wound on this structure, and either a recording signal current on an erasing current can be supplied to the coil 46. Preferably, the permalloy film 15 of the stylus electrode 13 is shielded except for its tip portion by means of a copper film 47 to prevent the adverse influence of high frequency loss in the stylus electrode 13 during reproduction.

Figure 7:
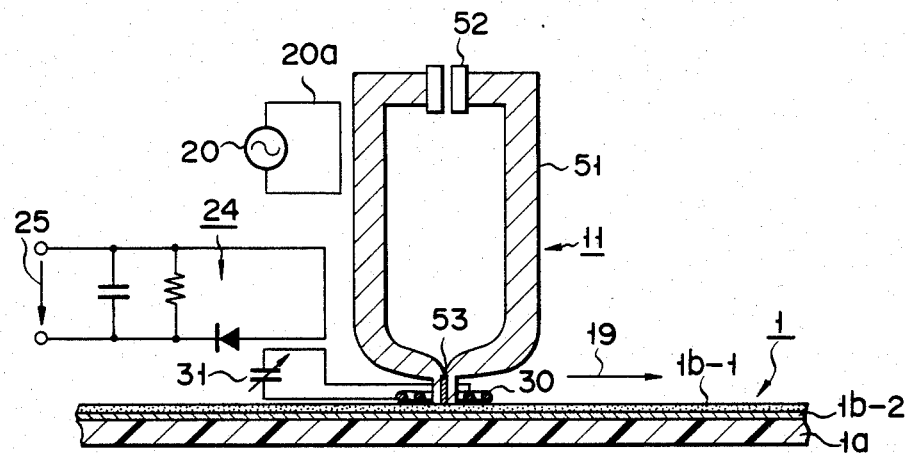

FIG. 7 shows a further embodiment, in which a parallel line resonator 51 is used in lieu of coaxial resonator. A magnetic film 53 of permalloy or the like, having its high frequency characteristics variable according to a signal field from magnetic tape 1, is provided at the tip of the resonator 51 opposing the tape 1. A second coupling coil 30 is wound on the magnetic film 53. The resonator 51 has a resonant capacitor 52. Again in this embodiment, high sensitivity reproduction is possible, in contrast to the case where the second coupling coil 30 is not used.

In the embodiment of FIGS. 1 to 7, magnetic materials such as Y1G, permalloy, sendust are used both in the reproducing head 11 and the magnetic recording medium 1. According to this invention, however, it is possible to realize the magnetic resonance without using the Y1G, permalloy or sendust in the magnetic recording medium 1.

Figure 8:
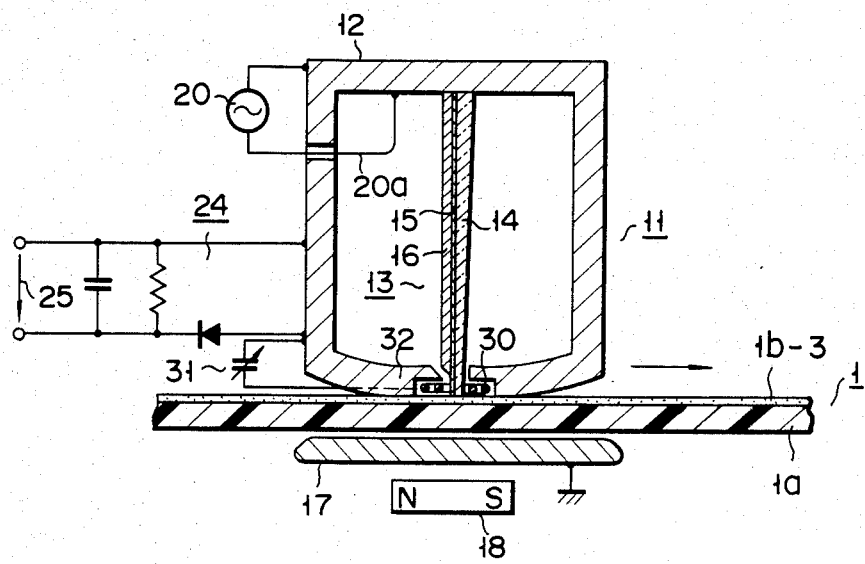

FIGS. 8 through 11 are embodiments. In FIG. 8, a magnetic tape 1 having a combination layer 1b-3 composed by mixing the materials of the layers 1b-1 and 1b-2 is used, and a reproducing head having the same construction as in the embodiment of 4 is used, wherein the magnetic resonance at the tip portion 15a of the permalloy fim 15 between the signal field and the high frequency supplied from the oscillator 20 is realized. The remainder of the construction and operation of the embodiment of FIG. 8 are the same as those of the FIG. 4 embodiment and the further explanation is omitted here.

Figure 9:
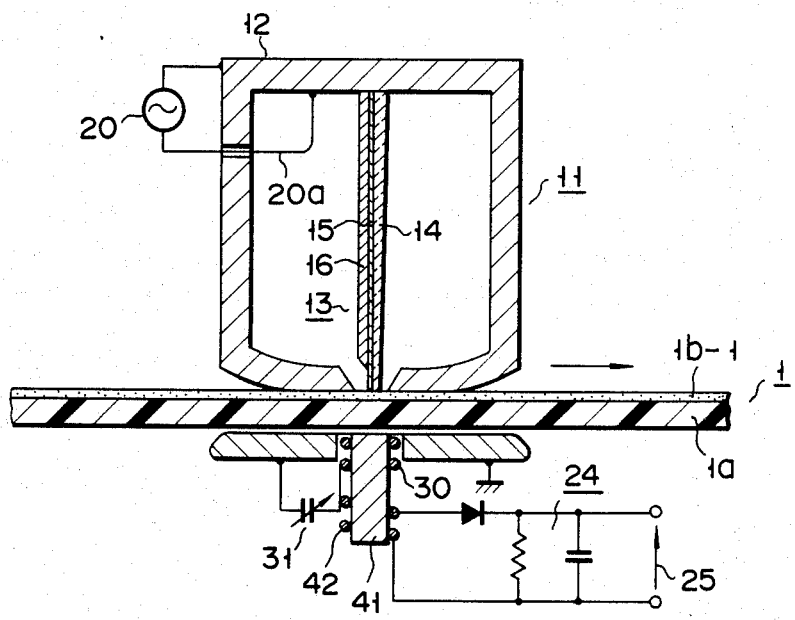
Figure 10:
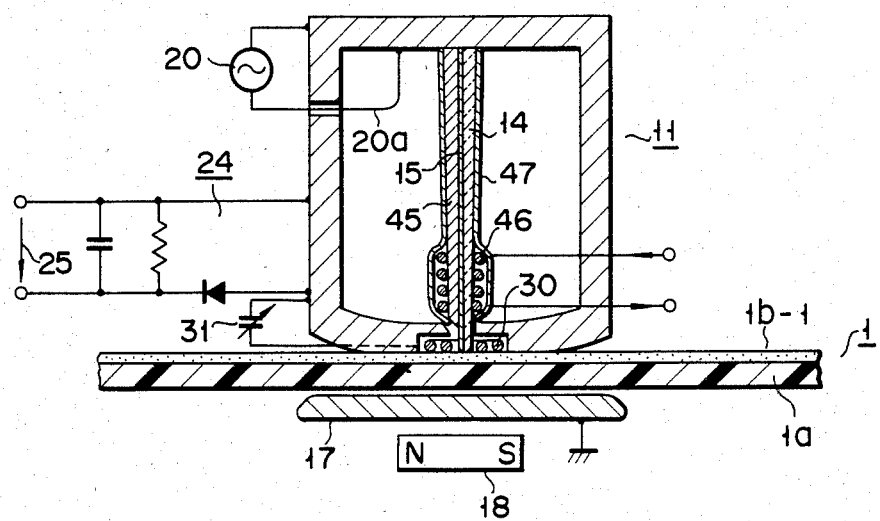
Figure 11:
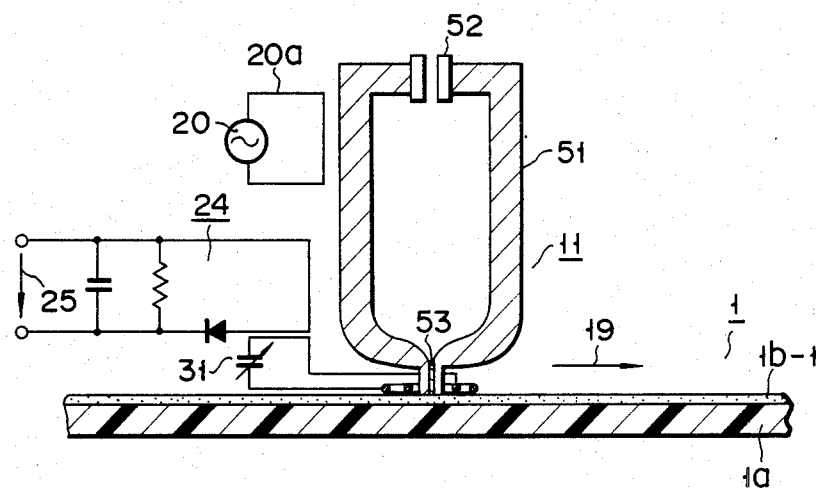

The embodiments of FIGS. 9 to 11 correspond to the embodiments of FIGS. 5 to 7 except for the magnetic recording medium, wherein a magnetic tape 1 of a conventional type is used. The magnetic resonance similarly occurs as in the embodiment of FIG. 8, and more detailed explanation of the construction and operation thereof is again omitted here.

In the mentioned embodiments of FIGS. 1 to 11, the magnetic resonance is utilized as a magnetic characteristic of the magnetic material that is variable with the signal field. It is also possible to utilize high frequency, low intensity field loss to vary the coupling degree of the high frequency coupling circuit for reproduction. Further, with a magnetic recording medium using, for instance, barium ferrite as a magnetic recording layer 1b-1, a function of varying the coupling degree of the high frequency coupling circuit together with its changes in characteristics according to the signal field can also be provided.

FIG. 12 shows a further embodiment. In this instance, the magentic tape 1 shown in FIG. 1 i used. A reproducing head 11 is constituted in the similar manner as in FIG. 1. In FIG. 12, no second coupling coil 30 is provided at the tip portion of the stylus electrode 13. The other parts of the device of FIG. 12 are similar to those of FIG. 1 and the explenation thereof will be omitted here.

The outer conductor 12, stylus electrode 13 and conductor 17 constitute a high frequency resonant circuit in the reproducing head 11 with a resonant current path thereof extending in the direction of thickness of the tape 1.

For reproducing signals recorded on the tap 1, the reproducing head 11 is moved relative to the tape 1 in the direction of arrow 19. High frequency energy in a microwave band, for instance from about 500 MHz to about 1,000 MHz, is supplied from a high frequency oscillator 20 to the high frequency resonant circuit, i.e., coaxial resonator, through a coupling coil 20a. The high frequency characteristics of the magnetic layer 1b-2 and the permalloy flim 15 such as high frequency loss or magnetic permeability thereof are varied according to the signal field from the tape 1. Utilization of the magnetic resonance of the magnetic material that arises from the relation between the applied high frequency energy and magnetic field permits great changes in the high frequency characteristics of the magnetic material to be obtained for utility. The high frequency voltage from the high frequency resonant circuit is modulated by the changes in either of the two high frquency characteristics. The changes in the high frequency voltage are detected by a peak detecting circuit 24 including a diode 21, a resistor 22 and a capacitor 23, whereby a reproduced output can be obtained.

In this embodiment, the level of the reproduced output 25 depends on the output energy level of the oscillator 20. Thus, a reproduced output signal having a sufficient level can be obtained with a satisfactory signal-to-noise ratio even with a small track width. Further, by reducing the thickness of the permalloy film 15 it is possible to increase the sensitivity of reproduction of signals recorded at high densities in the direction of the track length such as signals recorded by vertical magnetization recording. This permits super-high density recording and reproduction of signals, which have hitherto been impossible.

The magnetic layer 1b-2 noted previously may be readily reduced in thickness for it is formed as a surface layer of the magnetic tape 1. It is thus possible to increase the sensitivity of detection of the signal field. An oil film (not shown) may be formed on the surface of the magnetic layer 1b-2. The electrode 13 and magnetic layer 1b-2 are coupled to each other by the electrostatic capacitance due to the oil film.

FIG. 13 shows a further embodiment, which is used with the magnetic tape having the magnetic layer 1b-2 with the high frequency characterisitcs thereof variable with the signal field. Like the embodiment of FIG. 12, a conductive film 16 is formed on the portion of permalloy film 15 other than a tip portion 15a thereof for the purpose of reducing the high frequency loss. In this embodiment, the high frequency characteristics of mainly the tip portion 15a of the permalloy film 15 are varied according to the signal field from the magnetic tape 1. The changes in the high frequency characteristics cause changes the high frequency resonant circuit output voltage, these changes being similarly detected, whereby a reproduced output is obtained from the reproducing circuit 24.

FIG. 14 shows a modification of the stylus electrode 13 shown in FIG. 13. In this example, the permalloy film 15 is sandwiched between opposite side conductor films 16a and 16b.

FIGS. 15 and 12 show examples of the use of stylus electrode 13 as main magnetic pole of the vertical magnetization recording head. In the example of FIG. 11, an auxiliary magnetic pole 60 including a magnetic block 61 and an exciting coil 62 wound thereon is disposed on the side of magnetic tape 1 opposite to a stylus electrode 13 having the same structure as that shown in FIG. 9. It constitutes an auxiliary pole excitation type vertical magnetization head with permalloy film 15 of the stylus electrode 13 as the main magnetic pole. The magnetic recording film 1b-1 of the magnetic tape 1 can be magnetized in the perpendicular direction (i.e., thickness direction) by supplying a recording signal current 63 to the exciting coil 62. High density recording thus can be obtained. The vertical magnetization recording head may also be used as an erasing head with an AC or DC erasing current supplied to its instead of the recording signal current.

In the example of FIG. 16, a stylus electrode 13 constitutes a main pole excitation type vertical magnetization head as well. The head includes a ferrite film 64 formed on magnetic layer 15 of permalloy or the like such that a tip portion 15a thereof is exposed for permitting reproduction. An exciting coil 65 is wound on this electrode 13, and either the recording signal current 63 or an erasing current can be supplied to the coil 65. The stylus electrode 13 is shielded by a copper film 66 except for the tip portion 15a of the magnetic film 15 to prevent undesirable high frequency loss inthe stylus electrode 13 during reproduction.

In this embodiment, part of the reproducing head can be used as vertical magnetization recording head or erasing head.

Figure 17:
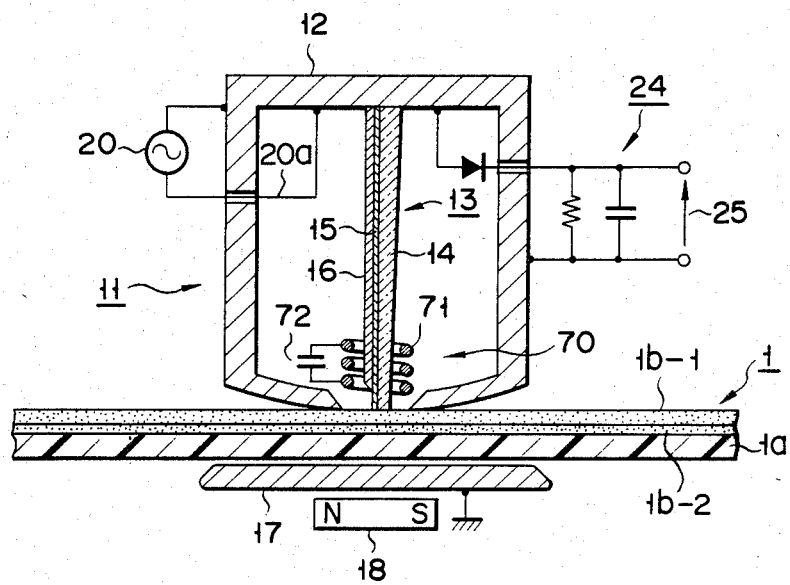

FIG. 17 shows a further embodiment, which includes an auxiliary resonant circuit 70. The auxiliary resonant circuit 70 has a coil 71 wound on stylus electrode 13, preferably in the neighborhood of the tip thereof, and a capacitor 72 connected in parallel with the coil 71. High frequency energy from oscillator 20 is supplied to the auxiliary resonant circuit for resonance, thereby improving the sensitivity of reproduction. In this embodiment, a strong magnetic field that is produced with the high frequency energy supplied to the auxiliary resonant circuit 70 is applied along with the signal field from the magnetic tape 1 to the permalloy film 15. Therefore, changes in the high frequency loss due to the magnetic resonance absorption by the magnetic film are augumented to increase the reproduced output 25. Experiments conducted by the inventor prove that the reproduction output signal is improved by substantially 10 times as compared to the device without the auxiliary resonant circuit 70.

Instead of providing the conductor 17 on the side of the magnetic tape 1 opposite the stylus electrode 13, a conductive material may be incorporated in the tape 1. As a further alternative, a conductive layer 1b-3 may be provided in lamination with the magnetic recording film 1b-1 to impart the tape 1 with conductivity. Where the magnetic tape 1 has a conductive surface, an insulting film such as an oil film may be provided on the conductive surface to avoid electric contact of the stylus electrode 13 with the conductive surface. The electrostatic capacitance that is provided by the insulating layer as an inter-layer dielectric may be included in a high frequency resonant circuit.

What is claimed is:

1. A magnetic recording and reproducing apparatus comprising:
    a magnetic material whose high frequency characteristic varies with a signal magnetic field from a magnetic recording medium;
    a high frequency coupling circuit whose coupling degree varies with said high frequency characteristic of the magnetic material; and
    means for reproducing a signal recorded on said magnetic recoding medium in accordance with the variation of the coupling degree of said high frequency coupling circuit.

2. The magnetic recording and reproducing system according to claim 1, wherein said magnetic recording medium includes:
    a base layer;
    a magnetic layer formed on said base layer and containing a magnetic recording material magnetizable according to recording signals.

3. The magnetic recording and reproducing system according to claim 1, wherein said magnetic recording medium includes:
    a base layer;
    a magnetic recording layer formed on said base layer and magnetizable according to recording signals; and
    a magnetic layer formed between said base layer and said magnetic recording layer and consisting of said magnetic material.

4. The magnetic recording and reproducing system according to claim 1, wherein said high frequency coupling circuit includes means for supplying high frequency energy into said high frequency coupling circuit.

5. The magnetic recording and reproducing system according to claim 1, wherein the coupling degree of said high frequency coupling circuit varies according to ferromagnetic resonance absorption by the magnetic material whose high frequency characteristics vary with said magentic field.

6. The magnetic recording and reproducing system according to claim 5, wherein said high frequency coupling circuit includes a high frequency generator for generating a high frequency signal with a frequency causing the ferromagnetic resonance absorption to the magnetic material together with the signal magnetic field, first and second coils intersected with each other, the magnetic material being disposed at a position corresponding to the intersected portion of the first and second coils, the high frequency signal being supplied to the first coil, whereby said high frequency coupling circuit provides a low degree of electromagnetic coupling as an electric circuit in the absence of a signal and provides a high degree of electromagentic coupling with the ferromagnetic resonance of the magnetic material.

7. The magnetic recording and reproducing system according to claim 3, wherein said high frequency coupling circuit is provided in a reproducing head including:
    a stylus electrode having a top in contact with one side surface of said magentic recoding medium; and
    a conductor provided on the other side of said magnetic recording medium in opposition to said stylus electrode.

8. The magnetic recording and reproducing system according to claim 7, wherein said magnetic recording medium includes a conductive layer formed on the side of said medium in contact with said stylus electrode.

9. The magnetic recording and reproducing system according to claim 7, wherein said stylus electrode includes:
    an insulating stylus base;
    a magnetic film provided on one side of said insulating stylus base and having high frequency characteristics which are variable with a signal magnetic field; and
    a conductive film formed on the surface of said magnetic film other than a portion thereof corresponding to the top of said stylus electrode.

* * * * *